United States Patent [19]

Engfer et al.

[11] Patent Number: 5,416,622

[45] Date of Patent: May 16, 1995

[54] ELECTRICAL CONNECTOR

[75] Inventors: Ronald J. Engfer, Woodbury; Laurence R. Gilbert, Marine-On-St. Croix, both of Minn.; Scott N. Iverson, Hudson, Wis.; Bryan L. Klaenhammer, St. Paul, Minn.; Stephen A. Miller, St. Paul, Minn.; George F. Vesley, Hudson, Wis.

[73] Assignee: Minnesota Mining and Manufacturing Company, St. Paul, Minn.

[21] Appl. No.: 11,973

[22] Filed: Feb. 1, 1993

[51] Int. Cl.6 .................. G02F 1/13; G02F 1/1343
[52] U.S. Cl. ......................... 359/88; 359/51; 315/169.3; 313/511; 313/49; 313/498; 313/51
[58] Field of Search .............. 359/51, 52, 87, 88, 359/84, 89; 439/59, 74; 315/169.3; 313/49, 505, 51, 511, 491, 492, 498

[56] References Cited

U.S. PATENT DOCUMENTS

| | | | |
|---|---|---|---|
| 2,735,970 | 2/1956 | Peck et al. | 317/258 |
| 3,132,204 | 5/1964 | Giellerup | 174/117 |
| 3,177,391 | 4/1965 | Devol et al. | 313/108 |
| 3,185,907 | 5/1965 | McKee et al. | 317/258 |
| 3,311,696 | 3/1967 | Melnick | 174/18 |
| 3,474,326 | 10/1969 | Lidoski et al. | 339/17 |
| 3,514,326 | 5/1970 | Stow | 117/227 |
| 3,580,738 | 5/1971 | Ranby et al. | 117/215 |
| 3,655,972 | 5/1972 | Somerset | 313/498 |
| 3,689,810 | 9/1972 | Walles | 317/258 |
| 3,762,946 | 10/1973 | Stow et al. | 117/227 |
| 3,778,306 | 12/1973 | Stow | 117/226 |
| 3,868,676 | 2/1975 | Hennessey et al. | 313/49 |
| 4,020,389 | 4/1977 | Dickson et al. | 315/246 |
| 4,086,526 | 4/1978 | Grudëlbach | 307/212 |
| 4,113,981 | 9/1978 | Fujita et al. | 174/88 |
| 4,138,620 | 2/1979 | Dickson | 313/1 |
| 4,159,921 | 7/1979 | Inohina et al. | 156/272 |
| 4,199,228 | 4/1980 | Destannes et al. | 359/80 |
| 4,295,711 | 10/1981 | Tanaka et al. | 359/88 |
| 4,386,293 | 5/1983 | Waldron | 313/583 |
| 4,386,295 | 5/1983 | Waldon | 359/88 |
| 4,396,932 | 8/1983 | Alonas et al. | 257/110 |
| 4,427,479 | 1/1984 | Glaser et al. | 313/588 |
| 4,435,047 | 3/1984 | Fergason | 350/334 |
| 4,548,862 | 10/1985 | Hartman | 428/323 |
| 4,569,877 | 2/1986 | Tollefson et al. | 428/141 |
| 4,606,962 | 8/1986 | Reylek et al. | 428/148 |
| 4,618,911 | 10/1985 | Cichanowski et al. | 361/308 |
| 4,647,337 | 3/1987 | Simopoulos et al. | 156/633 |
| 4,688,900 | 8/1987 | Doane et al. | 350/347 |
| 4,699,470 | 10/1987 | McLaughlin et al. | 359/51 |
| 4,708,914 | 11/1987 | Kamijo | 428/690 |
| 4,745,334 | 5/1988 | Kawachi | 313/512 |
| 4,789,858 | 12/1988 | Ferguson et al. | 359/51 |
| 4,806,922 | 2/1989 | McLaughlin et al. | 359/88 |
| 4,837,452 | 6/1989 | Peterson | 307/2 |
| 4,878,010 | 10/1989 | Weber | 323/300 |
| 4,904,901 | 2/1990 | Kimopoulos et al. | 313/509 |

(List continued on next page.)

FOREIGN PATENT DOCUMENTS 2615323 10/1976 Germany .
3638858 5/1987 Germany .

OTHER PUBLICATIONS

Displays, vol. 11, No. 2, Apr. 1990, Winkle et al., Interconnection and Packaging of Liquid Crystal Displays, pp. 83–86.

Elecronics & Communication Journal, vol. 4, No. 2, Apr. 1992, Spruce et al., Polymer Dispersed Liquid Crystal (PDCL) Films, pp. 91–100.

Primary Examiner—William L. Sikes
Assistant Examiner—Kenneth Parker
Attorney, Agent, or Firm—Gary L. Griswold; Walter N. Kirn; Robert W. Sprague

[57] ABSTRACT

An electrical connector adapted for placement on a single edge of a thin film device having an electrically responsive layer to deliver electric current from a power supply to at least one electrode in electrical contact with the electrically responsive layer. The electrical connector extends part way into the electrically responsive thin film layer. The electrically responsive thin film can be a liquid crystal or polymer dispersed liquid crystal, an electroluminescent layer, or an electrochromic layer.

42 Claims, 5 Drawing Sheets

U.S. PATENT DOCUMENTS

| | | | |
|---|---|---|---|
| 4,930,876 | 6/1990 | Suzuki et al. | 359/88 |
| 4,945,322 | 7/1990 | Okumura | 333/184 |
| 4,956,031 | 9/1990 | Mori | 156/67 |
| 4,983,934 | 1/1991 | Okumura | 333/184 |
| 4,999,539 | 3/1991 | Coovert et al. | 313/505 |
| 5,003,222 | 3/1991 | Washo | 313/511 |
| 5,045,755 | 9/1991 | Appelberg | 313/498 |
| 5,067,796 | 11/1991 | Suzuki et al. | 359/88 |
| 5,142,644 | 8/1992 | VanSteenkiste et al. | 359/88 |
| 5,202,677 | 4/1993 | Parker et al. | 359/44 |
| 5,223,965 | 6/1993 | Ota et al. | 359/88 |

ELECTRICAL CONNECTOR

BACKGROUND OF THE INVENTION

1. Field of the Invention

This invention relates to electrical connectors for thin film devices (i.e., devices having one or more thin film electrodes in which the thickness of each electrode is less than about, e.g., 2 $\mu$m) having an electrically responsive layer designed to deliver electric current from a power supply to an electrode.

2. Description of the Related Art

Many types of thin film devices having an electrically responsive layer are known. They include thin film electro-optical devices in which the optical properties of the electrically responsive layer change. Electric current is supplied to the device by means of a connector that delivers current from an external power supply to at least one electrode in contact with the electrically responsive layer.

One example of a thin film electro-optical device is an electrochromic device. Such a device relies upon a reversible chemical reaction that takes place in the electrically responsive layer upon application of current to cause a change in optical properties.

A second example is a display device containing a layer of electrically responsive liquid crystal material. Application of an electric field causes the alignment, and thus the optical properties, of the liquid crystal layer to change.

A third example is the so-called Nematic Curvilinear Aligned Phase ("NCAP") device described, e.g., in Fergason, U.S. Pat. No. 4,435,047, hereby incorporated by reference. These devices include an electrically responsive liquid crystal layer in which nematic liquid crystal material is encapsulated in a polymer matrix. The encapsulated material is prepared by combining the liquid crystal material with the polymer matrix in the form of an aqueous emulsion, and then casting a film from the emulsion. These devices are relatively translucent in the absence of an electric field due to light scattering, but are relatively transparent upon application of a field.

A fourth example of electro-optical device is the Polymer-Dispersed Liquid Crystal ("PDLC") device described, e.g., in Doane et al., U.S. Pat. No. 4,688,900, hereby incorporated by reference. These devices include an electrically responsive liquid crystal layer in which liquid crystal droplets are dispersed throughout a polymer matrix. The liquid crystal layer is prepared by combining the liquid crystal material with a polymerizable matrix precursor and then subjecting the mixture to polymerization conditions. Polymerization causes phase separation of the liquid crystal material, resulting in the formation of liquid crystal droplets dispersed throughout the polymerized matrix. Like the NCAP devices, these PDLC devices are translucent in the absence of an electric field due to light scattering and become transparent upon application of the field.

Reverse mode PDLC devices are also known. These devices are transparent in the absence of an electric field and become translucent upon application of the field.

A fifth example is an electroluminescent device. In such a device, the electrically responsive layer consists of electrically responsive particles (e.g., zinc sulfide) that luminesce upon application of current.

In all of these devices, it is necessary to establish an electrical connection between the electrode and the power supply. One example of such a connector is shown in Mori et al., U.S. Pat. No. 4,956,031. Mori describes an electroluminescent device having an "auxiliary electrode" in the form of a long narrow strip. The purpose of the "auxiliary electrode" is to distribute voltage over the entire electroluminescent layer and to provide a connection to the power supply. It consists of a conductive metal layer sandwiched between an insulating layer and an electrically conductive adhesive. The "auxiliary electrode," in turn, is sandwiched between the electroluminescent layer and the electrode of the device such that the insulating layer contacts one face of the electroluminescent layer, while the adhesive contacts one face of the electrode. The "auxiliary electrode" is not inserted into the electroluminescent layer.

The connection between the power supply and electrode is often the source of failure in thin film devices, resulting in melting and subsequent arcing of the electrode layer. There is a need, therefore, for a compact electrical connector that provides a reliable connection between the power supply and electrode of such thin film devices.

SUMMARY OF THE INVENTION

In general, the invention features an electrical connector adapted for placement on a single edge of a thin film device having an electrically responsive layer. The connector is configured to deliver electric current from a power supply to at least one electrode in electrical contact with the electrically responsive layer. It includes:

(a) a flexible insulator having on at least one face an electrically conductive portion adapted to establish electrical contact between an electrode of the thin film device and a power supply, at least a portion of the insulator being adapted for insertion into a portion of the electrically responsive layer of the device, (b) an electrically conductive adhesive provided on the electrically conductive portion of the insulator adapted to be placed adjacent to the electrode to establish electrical contact with the electrode, and (c) connector means in electrical contact with the electrically conductive portion of the insulator and adapted to establish electrical contact with a power supply.

The electrically conductive adhesive includes electrically conductive particles dispersed throughout an adhesive matrix in which the effective contact area between the electrically conductive particles and the electrode of the device (i.e., the portion of the adhesive which is actually electrically conductive) is sufficiently high to ensure current transfer while minimizing heat build-up in the area of the electrode directly beneath the conductive particles.

In preferred embodiments, the electrically conductive adhesive is flexible. Examples of suitable adhesives include pressure sensitive adhesives, hot melt adhesives, thermoset adhesives, and thermoplastic adhesives. The thickness of the adhesive on each electrically conductive portion preferably is no greater than about 50 $\mu$m.

Examples of suitable materials for the insulator include films such as polyester (e.g., poly(ethylene terephthalate) or poly(ethylene naphthalate)), polyimide, polyether imide, polysulfone, poly(phenylene oxide), and polyether ether ketone films. Other suitable materials for the insulator include non-electrically conductive adhesives. One or both faces of the insulator may be provided with an electrically conductive portion; in the latter case (which is useful for establishing electrical connections to multiple electrode areas), both electrically conductive portions are provided with an electrically conductive adhesive.

The electrically conductive portion of the insulator preferably includes at least one metal strip in contact with at least a portion of a face of the insulator. Contact may be established by adhering or metallizing the strip to the insulator face; the strip may also simply be placed against the insulator face. Preferred materials for the electrically conductive portion include silver and copper.

In one embodiment, for example, the insulator is a poly(ethylene terephthalate) film and each electrically conductive portion includes a copper foil adhered to at least a portion of a face of the film. In another embodiment, the insulator is also a poly(ethylene terephthalate) film, but each electrically conductive portion includes a silver strip metallized to at least a portion of a face of the film.

The connector means may include at least one wire connector pad. This pad may be soldered, adhered, or otherwise attached to the electrically conductive portions of the insulator. Alternatively, the electrically conductive portion itself may form the connector means if its thickness is sufficient to provide a mechanically stable and electrically conductive connection.

The invention also features a thin film device (e.g., an electro-optical device in which the optical properties of the electrically responsive layer change upon application of electric current) incorporating the above-described electrical connector. Examples of suitable devices include electro-optical devices in which the electrically responsive layer is an electroluminescent layer, an electrochromic layer, a liquid crystal layer, a PDLC layer, or an NCAP layer.

The electrode of the device (which extends beyond the electrically responsive layer) may be provided with a buss bar to distribute current throughout the electrode. The device may also further include a power supply, e.g., a line-operated zero cross power supply.

The electrically responsive layer and the electrode of the device preferably are sandwiched between two sheets of optically clear glazing material (e.g., glass or a polymer such as polycarbonate or poly(methyl methacrylate)), and the electrical connector is configured such that the connector means and a portion of the insulator (and its associated electrically conductive portion) lie beyond the edge of at least one of the sheets such that electrical contact with a power supply is established beyond the edge of at least one of the sheets. The inner surfaces of the optically clear glazing material may further be provided with a layer of an optically clear thermoplastic polymer that flows at the temperatures used to laminate the components of the device together. Examples of suitable polymers include poly(vinyl butyral), polyurethanes displaying thermoplastic properties in the range of lamination temperatures, and ethylene vinyl acetate copolymers.

In one embodiment of the above-described device, the sheets may be offset relative to each other, in which case the connector means and a portion of the insulator (and its associated electrically conductive portion) lie beyond the edge of only one of the sheets such that electrical contact with the power supply is established beyond the edge of only one of the sheets. In another embodiment, the sheets are aligned with each other such that the connector means and a portion of the insulator (and its associated electrically conductive portion) lie beyond the edges of both sheets, in which case electrical contact with the power supply is established beyond the edge of both sheets as well.

The invention provides a reliable electrical connection between the electrode of a thin film device and an external power supply. In addition, the compact design of the electrical connector (which is adapted to be placed along only a single edge of the device) facilitates use of thin film devices incorporating the connector in applications such as architectural and automotive panels and windows. The connector enables the panel or window to be trimmed to size along its total perimeter except for the relatively small area where the connector is positioned. It also enables the device to be used with a variety of geometrically shaped panels and windows. In contrast, prior art connectors, which typically require connections along the length of two opposed edges of the device, could only be used with difficulty in panels and windows having geometries other than square or rectangular. Moreover, because the connector is incorporated into the thin film device as part of the lamination procedure, the devices may be readily manufactured in a cost-effective assembly.

Other features and advantages will be apparent from the following description of the preferred embodiments, and from the claims.

DESCRIPTION OF THE PREFERRED EMBODIMENT

Figure 1:
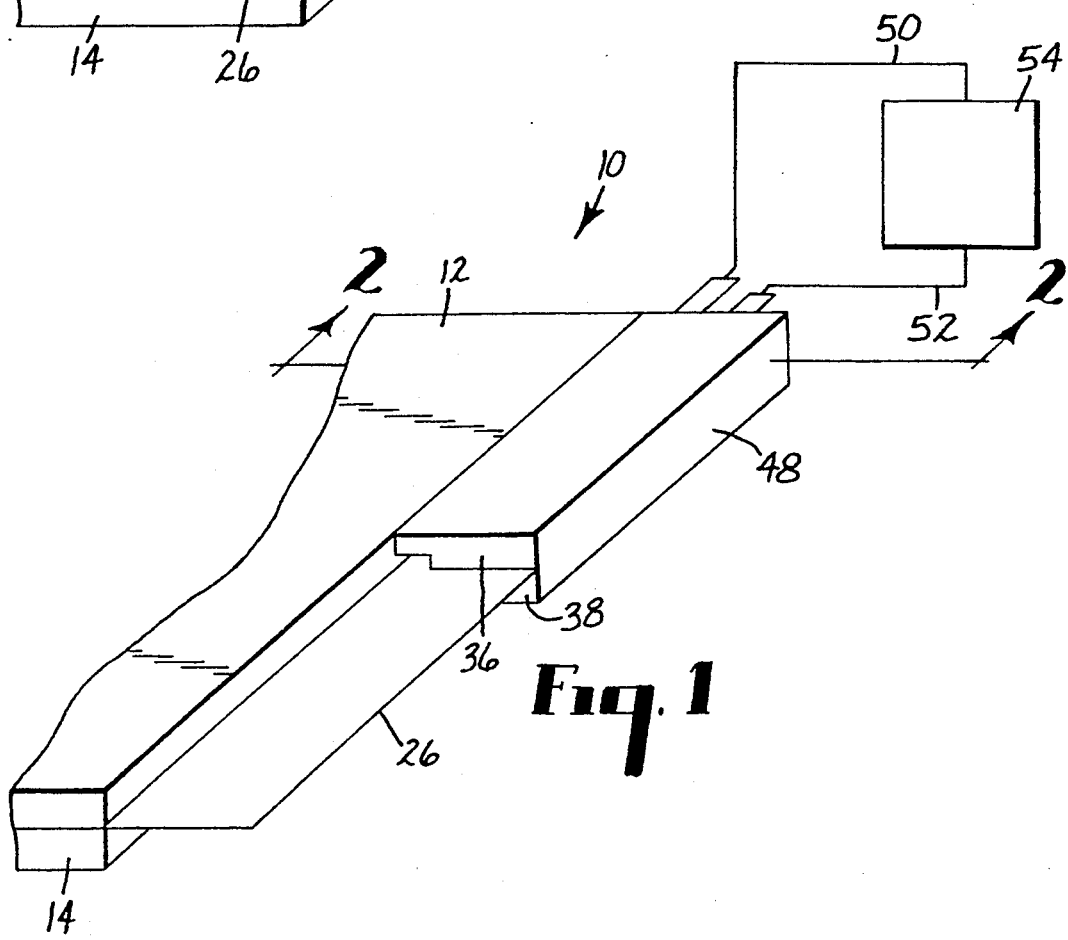
FIG. 1 is a perspective view of a thin film device having an electrical connector according to one embodiment of the invention.
Figure 2:
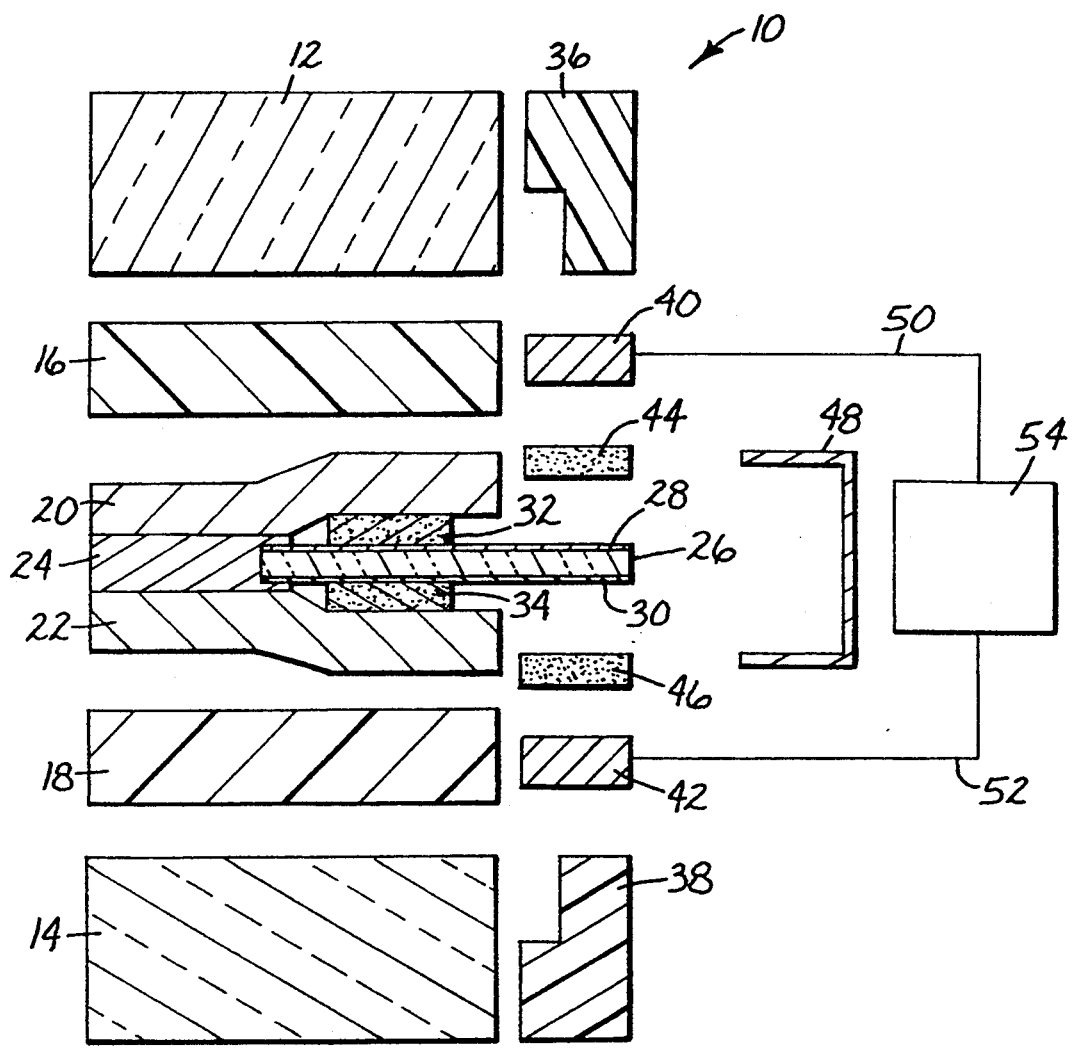
FIG. 2 is a cross-sectional view, taken at 2—2, of the structure shown in FIG. 1 expanded to show detail.

Referring to FIGS. 1 and 2, there is shown an electro-optical device 10 featuring an electrically responsive layer 24 sandwiched between a pair of electrodes 20, 22. The combined thickness of the electrodes and electrically responsive layer ranges from about 25–400 $\mu$m. Both electrodes extend beyond one edge of electrically responsive layer 24 such that there is a gap between the two electrodes. Electrically responsive layer 24 may be, e.g., an electroluminescent, electrochromic, liquid crystal, PDLC, or NCAP layer. Suitable materials for the conductive portion of electrodes 20, 22 include conventional conductors such as indium-tin oxide, silver, aluminum, chrome, titanium, stainless steel, and gold films and foils. The electrodes may be transparent or non-transparent depending on the thickness of the material (with the thicker materials forming non-transparent electrodes). In the case of electro-optical devices, it is preferred that at least one of the electrodes be transparent. Typically, the film or foil is deposited on a flexible polymer film, e.g., a polyester film.

Electrodes 20, 22 and electrically responsive layer 24, in turn, are sandwiched between a pair of optically clear sheets 12, 14 (thickness of each sheet equals approximately 0.3 cm). Suitable materials for the sheet include glass and optically clear polymers such as polycarbonate and poly(methyl methacrylate). The inner surface of each sheet in contact with the electrodes is provided with a film 16, 18 (each approximately 375 μm thick) of a thermoplastic polymer that flows at the lamination temperatures and pressures used to assemble the device. The purpose of the polymer film is two-fold. First, it bonds the electrically responsive layer to optically clear sheets 12, 14 to form a laminate. Second, where the electrodes and electrically responsive layer are inset relative to one or both edges of sheets 12, 14, the polymer film also forms a seal around the electrodes and electrically responsive layer following lamination to enhance environmental resistance. Suitable materials for the film include poly(vinyl butyral), polyurethanes that flow at the temperatures used for lamination, and ethylene vinyl acetate copolymers, with poly(vinyl butyral) being preferred.

In the embodiment shown in FIGS. 1 and 2, sheets 12, 14 are aligned such that the inner and outer edges of both sheets are aligned with the inner and outer edges of electrodes 20, 22. This arrangement necessitates the use of a clip 48 (0.95 cm×0.6 cm) to maintain the integrity of the electrical connector portion of the device. The electrical connector will now be described.

An insulator film 26 (thickness approximately 25–100 μm) inserted partially into electrically responsive layer and extending beyond the outer edges of electrodes 20, 22 is used to establish an electrical connection between the electrodes and an external power supply 54 (preferably a line-operated zero cross power supply). Suitable materials for insulator 26 include polyesters such as poly(ethylene terephthalate) and poly(ethylene naphthalate), polyimides, polyether imides, polysulfones, poly(phenylene oxides), and polyether ether ketone, with poly(ethylene terephthalate) being preferred. Each face of insulator 26 is provided with an electrically conductive film 28, 30; the thickness of each film is approximately 0.01–100 μm. Suitable materials for the film include copper, silver, aluminum, gold, and other high conductivity metals. The film preferably is metallized to the face of the insulator (in which case the film thickness is closer to 0.1 μm) or adhered to the face using an adhesive; in the latter case, the film is preferably provided in the form of a foil (e.g., a copper foil), in which case the thickness can approach to 100 μm.

The portion of insulator 26 lying between electrodes 20, 22 is used to establish an electrical connection between the insulator and the electrodes. This connection is established by way of an electrically conductive adhesive 32, 34 placed on the opposed faces of electrically conductive films 28, 30; the thickness of each adhesive portion is approximately 12–50 μm. The electrically conductive adhesive consists of an adhesive matrix (e.g., a pressure sensitive, hot melt, thermoplastic, or thermoset matrix) throughout which electrically conductive particles are dispersed. Such adhesives are well-known; examples include commercially available materials such as Creative Materials 108-10 (Creative Materials, Inc., Tyngsboro, Mass.) and 3M 9703 (3M, St. Paul, Minn.).

The effective contact area between the electrically conductive particles and the electrode of the device is chosen such that it is sufficiently high to ensure current transfer while minimizing heat buildup in the area of the electrode directly beneath the conductive particles. In this way, electrode breakdown and subsequent arcing is minimized, while at the same time minimizing connector size. The effective contact area for a particular device is chosen based upon factors such as the surface area of the electrodes, the thickness of the adhesive, the thickness of the electrodes, the ability to conduct heat away from the connector area, and the material used to form the electrode (e.g., the conductivity and thermal stability of that material), all of which influence effective contact area. It is within the ability of a person of ordinary skill in the art to select appropriate contact areas based upon these parameters.

The portion of insulator 26 extending beyond the outer edge of electrodes 20, 22 is used to establish the electrical connection between insulator 26 (and thus electrodes 20, 22) and power supply 54. A pair of insulating pads 36, 38 (0.16 cm×0.95 cm), each of which is provided with a copper foil buss wire connector pad 40, 42 (thickness approximately 25 μm each) connects a pair of wire leads 50, 52 from power supply 54 to device 10; the leads are soldered to copper foil busses 40, 42. An adhesive 44, 46 (thickness approximately 12.5 μm) placed between the copper busses and the electrically conductive films establishes the electrical connection to the electrically conductive films (and thus electrically responsive layer 24). A variety of electrically conductive adhesives are suitable for adhesive 44, 46. Examples include the Creative Materials 108-10 and 3M 9703 adhesives described above. During lamination, the thermoplastic polymer films 16, 18 flow. To accommodate this flow, each insulating pad 36, 38 is provided with a groove (0.16 cm×0.08 cm) into which the polymer flows during lamination.

Figure 3:
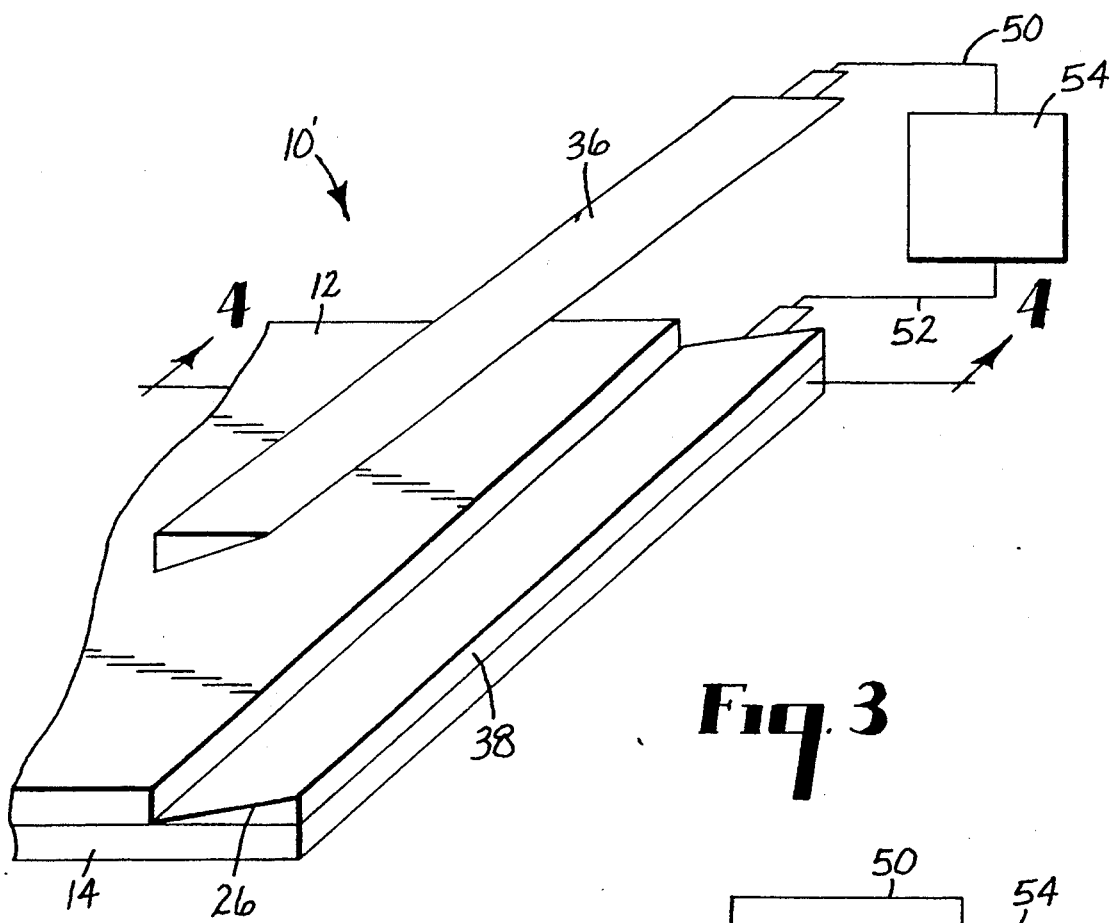
FIG. 3 is a perspective view of a thin film device having an electrical connector according to a second embodiment of the invention.
Figure 4:
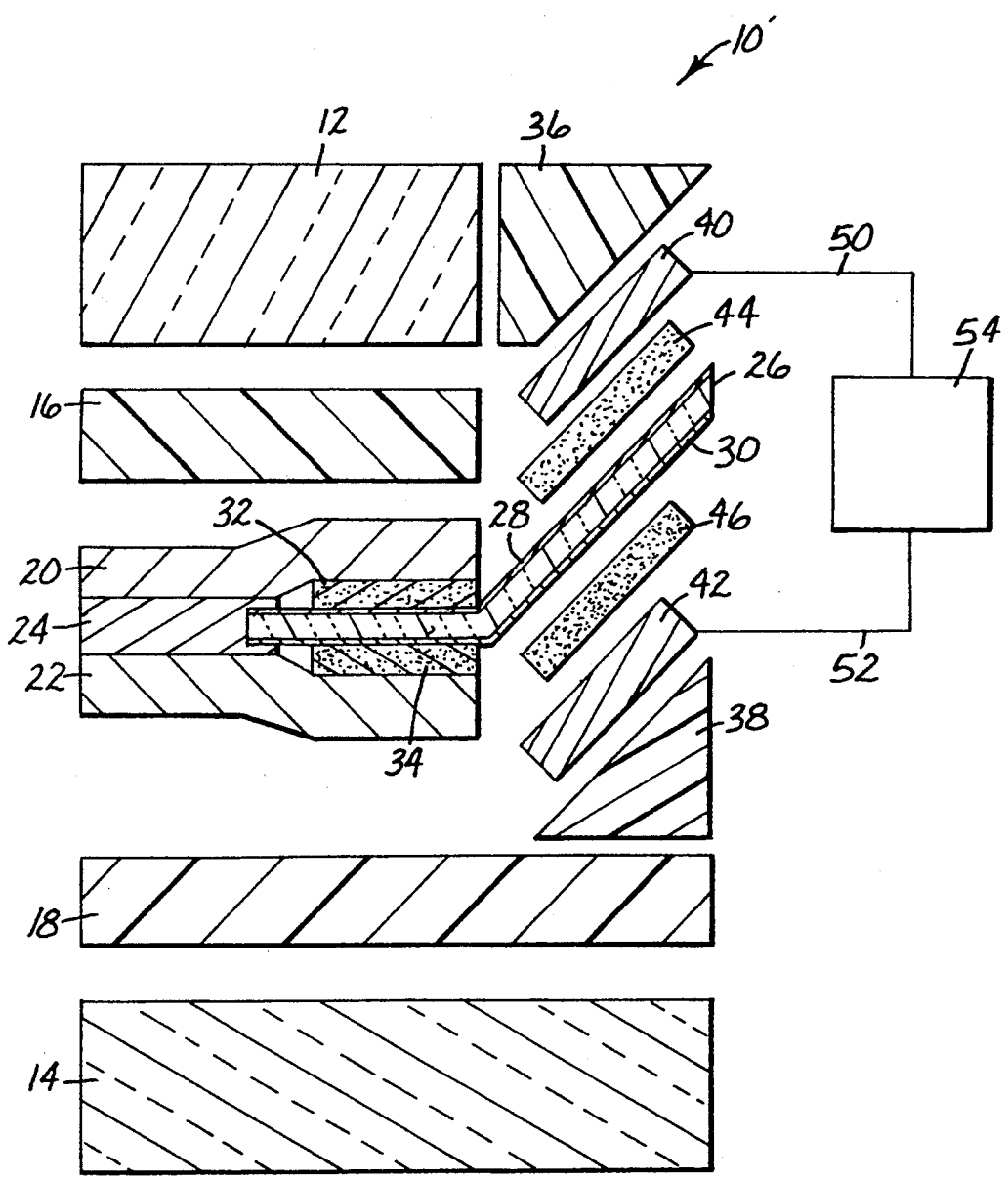
FIG. 4 is a cross-sectional view, taken at 4—4, of the structure shown in FIG. 3 expanded to show detail.

A second embodiment is shown in FIGS. 3 and 4. This embodiment is similar to the embodiment shown in FIGS. 1 and 2, except that optically clear sheets 12, 14 are offset relative to each other such that the outer edges of electrodes 20, 22 terminate at the outer edge of only one of the sheets (sheet 12). This arrangement creates an offset area in which the electrical connector (protruding portion of insulator 26 and associated conducting films 28, 30; copper foil buss wire connector pads 40, 42; insulating pads 36, 38; and adhesive portions 44, 46) rests. The advantage Of this arrangement is that it obviates the need for a separate clip to hold the connector together, and enables production of a more compact device because the electrical connector does not protrude beyond the outer edge of the device (i.e., beyond the outer edges of both sheets 12 and 14).

Figure 5:
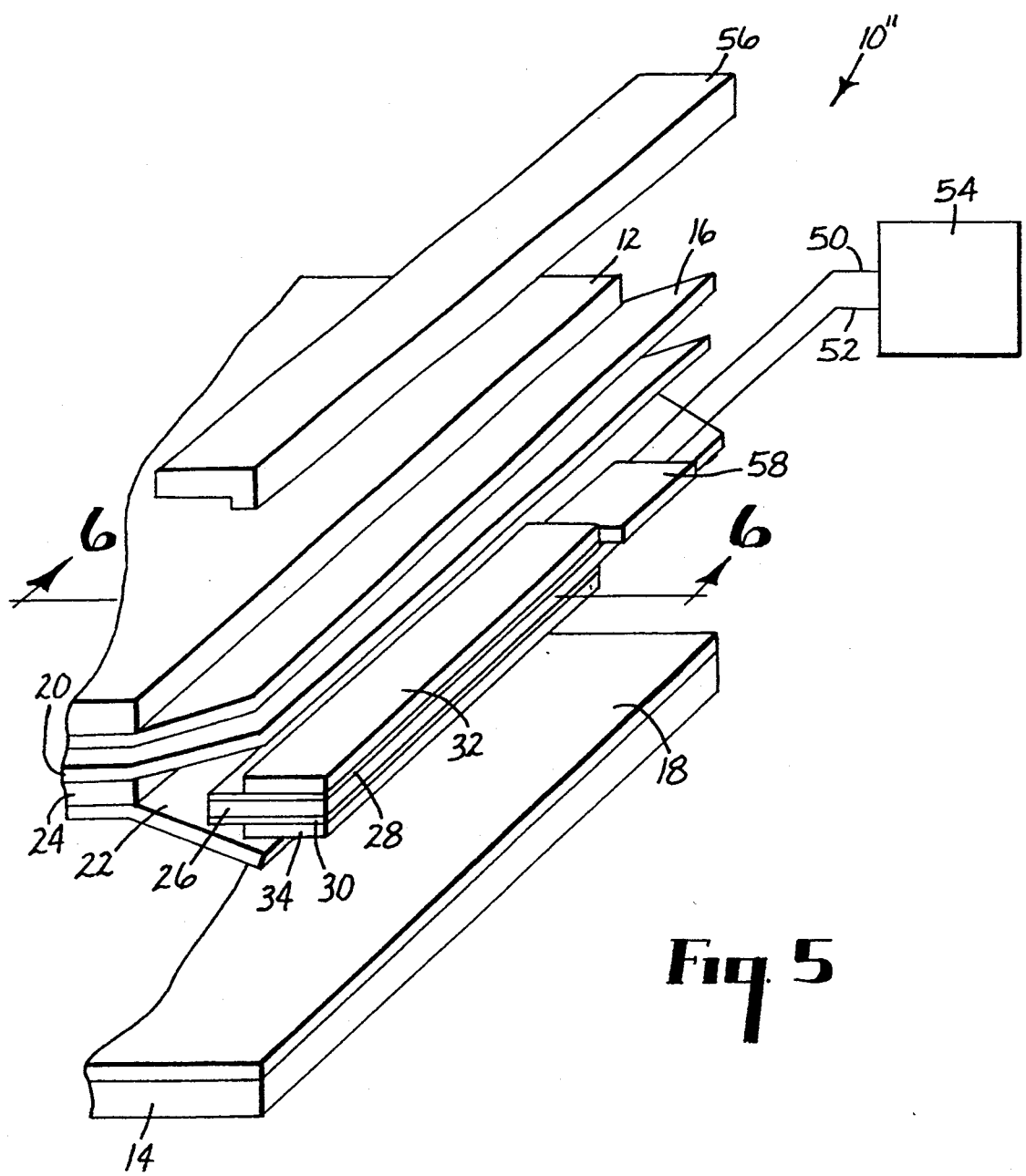
FIG. 5 is a perspective view of a thin film device having an electrical connector according to a third embodiment of the invention.
Figure 6:
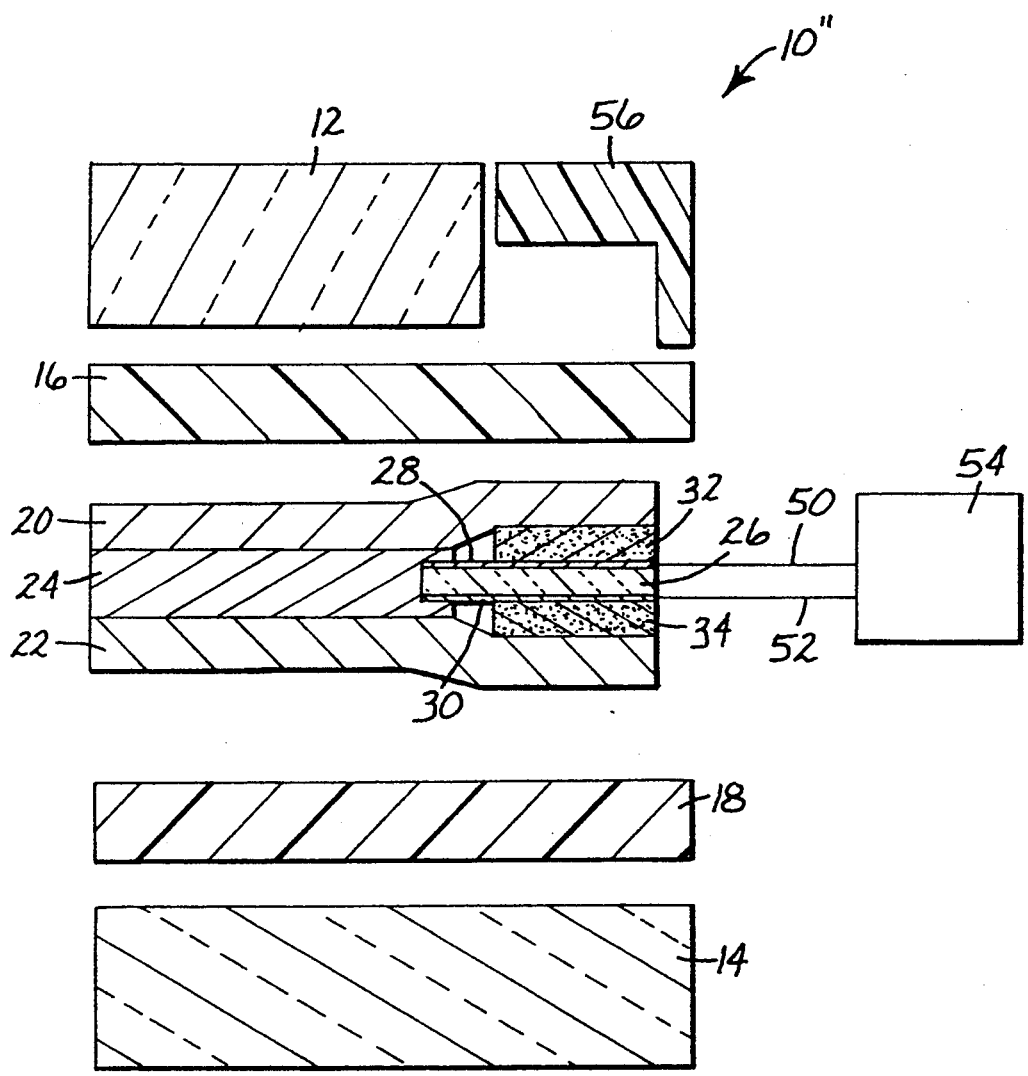
FIG. 6 is a cross-sectional view, taken at 6—6, of the structure shown in FIG. 5 expanded to show detail.

A third embodiment is shown in FIGS. 5 and 6. Like the embodiment shown in FIGS. 3 and 4, sheets 12 and 14 are offset relative to each other such that the electrical connector resides within the offset area. However, in contrast to the previous embodiments, electrodes 20, 22 and electrically responsive layer 24 are displaced relative to one edge of sheets 12 and 14. The advantage of this arrangement is that during lamination, polymer films 16, 18 flow around the electrodes and electrically responsive layer to seal it from the environment, thereby further enhancing environmental resistance. An L-shaped cover 56 helps secure the connector elements to sheets 12, 14. During lamination, films 16, 18 flow to fill in the groove created by the L-shaped cover. An insulating film such as a silicone rubber boot 58 preferably surrounds and protects the wire leads 50, 52; other suitable materials for the insulating film include polyester (e.g., poly(ethylene terephthalate) or poly(ethylene naphthalate)), polyimide, polyether imide, polysulfone, poly(phenylene oxide), and polyether ether ketone, together with a suitable non-electrically conductive adhesive.

Another difference between this embodiment and previous embodiments is that in this embodiment device 10 lacks separate wire connector pads (such as copper foil busses 40, 42 shown in FIGS. 1-4) to establish a connection to the wires 50, 52 leading to power supply 54. Instead, electrically conductive portions 28, 30 (e.g., in the form of copper foils) perform this role. The thickness of portions 28, 30 should be about 12 $\mu$m, enabling the wires to be soldered or crimped directly to them. Alternatively, if the foil is about 500 $\mu$m, portions 28, 30 can act as the male end of a connector means in which the female end contains the wires leading to the power supply. In any event, the connection to wires 50, 52 is made directly to portions 28, 30, thereby obviating the need for the separate wire connector pads 40, 42 shown in FIGS. 1-4.

The invention will be further understood by reference to the following examples.

ELECTRODE FILMS

Three different electrode films (i.e., polymer backing films to which a thin electrically conductive film had been applied) were evaluated in conjunction with the connector devices of the present invention. These materials were:

Electrode Film Type A A 50 micron thick polyester film with a vapor deposited Ag coating prepared by standard Ag coating or evaporation techniques, which was 15 nm thick, having a resistivity of 4 ohms/square and a luminous transmission of about 50%, further comprising a thin, passivating $Al_2O_3$ coating, approximately 45 nm thick, which was vapor deposited over the Ag coating using a process similar to that disclosed in Cox, J. T., Haas, G., and Ramsay, J. B., "Improved Dielectric Films for Multilayer Coating and Mirror Protection," J. Phys. 25 (1964) pp. 250-54 to produce a film having a laminous transmission of about 60-70%;

Electrode Film Type B A 50 micron thick polyester film with a 120 nm thick vapor deposited indium tin oxide (ITO) coating having a resistivity of 70 ohms/square and a luminous transmission of 80%; and Electrode Film Type C A 50 micron thick polyester film with a 120 nm thick vapor deposited ITO coating having a resistivity of 70 ohms/square and a luminous transmission of 80%, the electrode having an additional stripe of a thicker, substantially opaque Ag buss bar coating underneath the ITO coating approximately 70 nm thick and having a resistivity of 0.67 ohms/square along one edge. The ITO coating was applied to the buss bar by standard thin film deposition techniques.

General Preparation of an Active Thin Film Light Modulating Matrix

Active thin film light modulating PDLC matrices were prepared in a manner similar to the following procedure. Equal parts by weight of liquid crystal material BL036 (available from EM Industries, Hawthorne, N.Y.) and Norland NOA65 (a thiol-ene based matrix material available from Norland Products, Inc., New Brunswick, N.J.) were heated to approximately 60° C., with mixing, until the liquid crystal material completely dissolved. The resulting liquid crystal solution was poured between two electrode films which were held with their conductive faces in a facing relationship by the nip rollers of a precision coater. The gap between the nip rollers was set to provide an uncured liquid crystal matrix coating thickness of 15 to 21 microns. The unpolymerized liquid crystal matrix solution was introduced into the space between the two electrode films such that it left an uncoated strip approximately 3 cm in width along one edge of the sandwich construction.

The liquid crystal matrix solution was polymerized by positioning the sandwich construction comprising the two electrode films and the uncured liquid crystal matrix solution between, e.g., a pair of opposed banks of fluorescent phosphor lighting elements, each bank being positioned to illuminate one of the electrode films, to produce the active thin film light modulating matrix. Lighting elements having spectral distribution between 280 and 400 nm are suitable for curing the matrix materials. For convenience, a lamp having a maximum output at 351 nm was employed. The lighting elements were adjusted so as to provide an average intensity of 1.1 mW/cm$^2$ through each electrode film. Each side of the sandwich construction received a total energy exposure of 100 mJ/cm$^2$. The construction as a whole was exposed to a total energy of 200 mJ/cm$^2$. The level of incident radiation was determined with an EIT low intensity UVIMAP radiometer having a spectral response in the range of 300 to 400 nm with a maximum at 358 nm.

Current was delivered from a power supply to the active thin film modulating PDLC matrix through a connector element having a typical construction comprising a central, 25 $\mu$m thick polyester insulating film, approximately 3 cm in width and 10.2 cm in length, having a strip of 0.6 cm wide copper foil tape (#1181, available from 3M, St. Paul, Minn.) adhered to the opposing faces of the insulating film in a staggered configuration such that there was a separation of at least about 1 mm between the projection of one strip onto the opposing face of the insulator film and the copper strip on that face of the film. The copper strips were offset from the edge of the insulating film by at least 3 mm and copper wire leads were soldered to one end of each copper foil tape strip to provide an electrical connection to a power supply. Electrical connection between the connector element and the electrodes of the conductor film was achieved by means of a conductive adhesive which was placed between the copper foil strip and the liquid crystal matrix-free portions of the electrode films.

Thin film light modulating devices were prepared by carefully rolling the liquid crystal matrix-free edges of the electrode films back, placing the connector element between the electrode films such that the central insulating strip extended into the cured liquid crystal matrix approximately 3 mm, applying a conductive adhesive to the copper foil tape, repositioning the electrode films over the connector element and laminating the device with heat (typically 65°-75° C.) and pressure (typically 1.5×10$^5$ Pa) for a period of approximately 10–20 sec. All areas of the electrode film that were not separated by the connector element or the cured PDLC matrix were trimmed to prevent electrical shorting of the device.

EXAMPLES 1-3

Examples 1-3 examined the role that the electrode film plays in the service life of the active thin film light modulating device. In these Examples, all of the active thin film light modulating devices were connected to a Staco Variac power supply (available from Staco Inc., Dayton, Ohio) which delivered a 120 volt switch current, the pad area was 6.4 cm² the window area/connector area ratio was maintained at 154, an approximately 0.05 mm thick layer of a conductive pressure sensitive adhesive (an acrylate-based pressure sensitive adhesive having an approximately 5% by weight loading of 20-40 micron sized silver-coated nickel particles, #9703, available from 3M, St. Paul, Minn.) was utilized as the connective adhesive between the copper foil strip and the electrode film, and the test current was 0.03 amps.

The computer-controlled switching test consisted of applying power for 2 seconds, followed by 2 seconds off, while current, voltage, and a.c. power were measured with a Valhalla 2301 power meter (Valhalla Scientific, San Diego, Calif.). The test ended if the current sharply declined, indicating failure.

Switching service life data for various electrode film configurations are reported in Table 1.

TABLE 1

| | Electrode Film/Switch Life Data | |
|---|---|---|
| Example | Electrode Film Type | # Switches before failure |
| 1 | Type A | 1 |
| 2[1] | Type B | 15,000 |
| 3[1] | Type C | 15,000 |

[1]No failures occurred within the indicated number of switches.

The data in Table 1 suggest that the ITO based electrode films, with or without a thick Ag buss bar, are preferred as they provide superior switching service life.

EXAMPLES 4-8

The impact of the conductive adhesive on the switching service life of active thin film light modulating devices was studied utilizing the device construction of Example 2, except that a 1.3 cm wide copper foil tape was used, the pad area was 12.9 cm² the window area/connector area ratio was maintained at 540, a line-operated zero cross power switch was substituted for the Variac, various conductive adhesives were utilized to achieve electrical connection between the copper foil tape and the electrode film, and the test current was 0.23 amps. The device construction of Example 2 was selected for this study as it subjects the electrical connection interface between the connector element and the electrode film to very demanding conditions.

The thin film device was powered directly from a 120 volt, A.C., 60 Hz power line using a line-operated zero cross switch rated to switch at 3 volts or less (typically 1.8 volts) that displayed a maximum voltage spike of less than about 6 volts. The switch was based in part on a design generally described in Gemp, H., "Applications of Zero Voltage Crossing Optically Isolated Triac Devices," Motorola Optoelectronic Device Data (1988), pp. 9-72, except for modifications which provided for (a) powering the zero cross control circuitry within the device directly from the line (hence the term "line-operated"), rather than using an independent power source, and (b) the incorporation of input and output filters into the circuit. Both modifications were incorporated into the design to minimize the occurrence of switching-induced voltage spikes being fed to the thin film device.

With respect to the first modification, line-operated power for the zero cross power control circuitry was obtained in space efficient manner using a voltage drop module comprising a capacitor connected in parallel to a current safety bleed resistor. The voltage drop module operated in conjunction with a rectifier module and a filter module comprising a voltage rectifier and capacitor. With respect to the second modification, the input and output filters each comprised a 0.47 µF, 400 volt capacitor, with the input filter incorporated between the power source and the input leads of the thin film device, and the output filter interposed between the zero cross switch output leads and the thin film device.

A further reduction in the occurrence of switching-induced voltage spikes was realized by keeping the power circuit to the thin film device on at all times and energizing the device by switching the zero cross control circuitry on and off.

Switching service life data for various conductive adhesives are reported in Table 2.

TABLE 2

| | Conductive Adhesive/Switch Life Data | |
|---|---|---|
| Example | Conductive Adhesive Type | # Switches before failure |
| 4[1] | Creative Materials 108-10[2] | 62,000+ |
| 5 | Creative Materials #2524-41B[3] | 1 |
| 6 | Creative Materials 108-15[4] | 1 |
| 7 | 3M 9703 | 6 |
| 8 | Adhesive Research 8001[5] | 1 |
| 9 | Adhesive Research 8006[6] | 1 |

[1]No failures occurred within the indicated number of switches.
[2]A 0.5 mil thick hot melt adhesive having an approximately 64% by volume loading of 1-10 micron sized silver flakes which displays low contact resistance. The adhesive displayed xyz conductivity and has 50% effective surface contact area of the conductive particles with the thin film electrode. Available from Creative Materials, Inc., Tyngsboro, MA.
[3]A 0.5 mil thick hot melt adhesive having an approximately 32% by volume loading of 1-10 micron sized silver flakes which displays low contact resistance. The adhesive displayed xyz conductivity and has 35% effective surface contact area of the conductive particles with the thin film electrode. Available from Creative Materials, Inc., Tyngsboro, MA.
[4]A conductive silicone pressure sensitive composition containing 1-10 micron sized silver flakes which is applied as a low viscosity fluid to form an approximately 5 mil thick film. The adhesive material demonstrates only z axis conductivity and is available from Creative Materials, Inc., Tyngsboro, MA.
[5]A 5 mil thick pressure sensitive adhesive composition which demonstrates xyz axis conductivity. The material is available from Adhesive Research, Glenn Rock, PA.
[6]A 1 mil thick pressure sensitive adhesive composition which demonstrates z axis conductivity. The material is available from Adhesive Research, Glenn Rock, PA.

The connector elements were removed from the failed electro-optical devices of Examples 6-9 subsequent to the switch life test and the metallized surface of the electrode films examined under an electron microscope. This examination revealed that metal had been removed from the insulator surface in areas which corresponded to contact areas with the conductive particles in the adhesive.

These same active thin film light modulating matrices were subsequently reassembled into new electro-optical devices by substituting a new conductive adhesive in place of the original adhesive and the devices functioned normally. These data suggest that localized heating produced during switching caused or contributed to metal removal which interrupted the electrical contact between the connector element and the electrode element, rendering the device nonfunctional.

EXAMPLES 10-12

The impact of the power supply on the switching service life of an electro-optical device using the connector element of the present invention was examined using electro-optical devices described in Example 4 except that the pad area was 6.4 cm$^2$, the window area/connector area ratio was maintained at 1750, and the test current was 0.19 amps. Three power supplies capable of providing 120 volt AC currents of at least 4 amps were studied. The power supplies included: 1) A Staco Variac that was set to 120 volts and displayed both noise and a sharp voltage spike at switching which occurred at a random part of the current cycle (switching voltage spikes ranged from 0-70); 2) A computer controlled Kepco BOP-AC supply (available from Kepco, Inc., Fleming, N.Y.) that had substantially no noise but displayed a very sharp voltage spike at switching which occurred at a random part of the current cycle (switching voltage spikes ranged from 0-60); and 3) A line-operated zero cross switch as previously described.

Switching service life data for various power supplies are reported in Table 3.

TABLE 3

Power Supply/Switch Life Data

| Example | Power Supply | # Switches before failure |
|---|---|---|
| 10 | Variac | 81 |
| 11 | Kepco | 500 |
| 12[1] | Line-Operated Zero Cross switch | 15,000+ |

[1]No failures occurred within the indicated number of switches.

The data in Table 3 show a superior service life advantage for the electro-optical device of Example 12 which used a line-operated zero cross switch, suggesting that a power supply that displays minimum noise and low voltage spikes during switching is preferred.

EXAMPLES 13-25

The switching service life of electro-optical devices using the connector elements of the present invention as impacted by window area/connector area ratios, conductor film type and power supply type were the subject of additional studies.

Examples 13-17 utilized an electro-optical device of the general construction of the device of Example 1 except that the active thin film light modulating matrix consisted of a flexible window 8.9 cm×112 cm which had a series of five connectors of varying area (see Table 4) located along edges of the device, and the test current was 0.03 amps. A Kepco power supply was used in the switching studies for the device.

Examples 18-21 utilized an electro-optical device of the general construction of the device of Example 4 except that the active thin film light modulating matrix consisted of a flexible window 44.5 cm×127 cm which had a series of four connectors of varying area (see Table 4) located along one edge of the device, and the test current was 0.19 amps. A Kepco power supply was used in the switching studies for the device.

Examples 22-25 utilized an electro-optical device of the general construction of the device of Example 4 except that the active thin film light modulating matrix consisted of a flexible window 8.9 cm×127 cm which had a series of four connectors of varying area (see Table 4) located along one edge of the device, the type B electrode film was replaced with a type C electrode film, a line-operated zero cross power supply was used in the switching studies for the device, and the test current was 0.19 amps.

The results of the switching studies for these devices are reported in Table 4.

TABLE 4

Connector Area/Switch Life Data

| Example | Connector Area (cm$^2$) | Window Area/ Connector Area | # Switches before failure |
|---|---|---|---|
| 13 | 1.6 | 616 | 1 |
| 14 | 3.2 | 308 | 860 |
| 15[1] | 6.2 | 154 | 15,000+ |
| 16[1] | 12.9 | 77 | 15,000+ |
| 17[1] | 71 | 14 | 15,000+ |
| 18 | 0.4 | 14,000 | 1 |
| 19 | 1.6 | 3,500 | 100 |
| 20 | 3.2 | 1,750 | 500 |
| 21[1] | 6.4 | 875 | 20,000+ |
| 22[1] | 0.1 | 11,200 | 20,000+ |
| 23[1] | 0.2 | 5,600 | 20,000+ |
| 24[1] | 0.4 | 2,800 | 15,000+ |
| 25[1] | 1.6 | 700 | 15,000+ |

[1]No failures occurred within the indicated number of switches.

The data in Table 4 demonstrate a correlation between the service life of the electro-optical device, the pad area, the conductive adhesive and the power supply. Generally speaking, as the connector area increases the switch life of the device also increases, presumably because there is less demand placed on the individual particles in the conductive adhesive and their ability to conduct current from the connector to the electrode. The data also demonstrate that adhesives having a higher loading of conductive particles (i.e. Creative Materials 108-10 adhesive) provide a significant increase in switch life, presumably for the same reason. The electro-optical device construction emerging from this study indicates that it is possible to obtain durable and reliable devices having a window area/connector area ratio greater than about 5,000 using a type C electrode film in conjunction with a conductive adhesive having a high loading of conductive particles and a line-operated zero cross power switch.

EXAMPLE 26

An active thin film light modulating device prepared utilizing an active thin film light modulating matrix construction similar to Example 25 except that the active thin film light modulating matrix consisted of a flexible panel 29.5 cm×30.5 cm having the connector element extending along one edge of the element, the electrode area was 9.7 cm$^2$ the window area was 900 cm$^2$, and the window area/connector area ratio was 93, was laminated between two glass sheets in the offset glass sheet configuration illustrated in FIG. 5.

The thin film light modulating device was prepared by laminating the active thin film light modulating matrix between two glass panels, one panel measuring 29.5 cm×30.5 cm and the second measuring 30.5 cm×30.5 cm, utilizing two 30.5 cm×30.5 cm sheets of 11 mil thick poly(vinyl butyral), with the active thin film light modulating matrix positioned such that the electrode extended beyond the edge of the smaller glass panel. An "L" shaped terminal cover made from Ultem TM, (a polyether imide, available from General Electric Corp., Pottsville, N.Y.), was placed over the poly(vinyl butyral) such that it abutted the edge of the smaller glass panel and covered the connector element. The resulting construction was placed in an autoclave and laminated at approximately 140° C. and $13.9 \times 10^5$ Pa for approximately 2 hours to produce a unitized construction. Excess poly(vinyl butyral) was trimmed from the edges of the laminate and the resulting thin film light modulating device subjected to the previously described switch life testing. The device showed no failures after 20,000 switchings.

Other embodiments are within the following claims.

For example, the device may be provided with multiple electrode areas, each of which is separately addressable, whereby different portions of device may be addressed by selectively addressing particular electrode areas. Such an arrangement is particularly useful where the device is intended for use as a display device.

One of the electrodes may be non-transparent.

In addition, the electrically conductive portion may cover less than the entire insulator face.

The insulator may be a non-electrically conductive adhesive, rather than a thin film.

The electrode and electrically responsive layer assembly may be displaced relative to both opposed edges of the device.

Power supplies and switching mechanisms other than line-operated zero cross systems can be used as well, e.g., MOSFET-based switching systems.

What is claimed is:

1. An electrical connector adapted for placement on a single edge of a thin film device having an electrically responsive layer, said connector being configured to deliver electric current from a power supply to at least one electrode in electrical contact with the electrically responsive layer, said connector comprising a flexible insulator having on at least one face an electrically conductive portion adapted to establish electrical contact between an electrode of a thin film device and a power supply, at least a portion of said insulator being adapted for insertion into a portion of the electrically responsive layer of the device, an electrically conductive adhesive provided on said electrically conductive portion of said insulator adapted to be placed adjacent to the electrode to establish electrical contact with the electrode, said electrically conductive adhesive comprising electrically conductive particles dispersed throughout an adhesive matrix in which the effective contact area between the electrically conductive particles and the electrode of the device is sufficiently high to ensure current transfer while minimizing heat build-up in the electrode in the area beneath the electrically conductive particles, and connector means in electrical contact with the electrically conductive portion of said insulator and adapted to establish electrical contact with a power supply.

2. The electrical connector of claim 1 wherein said adhesive is flexible.

3. The electrical connector of claim 1 wherein said adhesive comprises a pressure sensitive adhesive, hot melt adhesive, thermoset adhesive, or thermoplastic adhesives.

4. The electrical connector of claim 1 wherein the thickness of said adhesive provided on said electrically conductive portion of said insulator is no greater than 50 μm.

5. The electrical connector of claim 1 wherein said insulator comprises a polyester, polyimide, polyether imide, poly(phenylene oxide), polysulfone, or polyether ether ketone film.

6. The electrical connector of claim 5 wherein said insulator is a poly(ethylene terephthalate) film.

7. The electrical connector of claim 1 wherein said electrically conductive portion of said insulator comprises at least one metal strip in contact with at least a portion of a face of said insulator.

8. The electrical connector of claim 7 wherein said metal strip is adhered to at least a portion of a face of said insulator.

9. The electrical connector of claim 7 wherein said metal strip is metallized to at least a portion of a face of said insulator.

10. The electrical connector of claim 1 wherein said electrically conductive portion comprises silver or copper.

11. The electrical connector of claim 1 wherein each face of said insulator is provided with an electrically conductive portion and each of said electrically conductive portions is provided with an electrically conductive adhesive.

12. The electrical connector of claim 1 wherein said connector means comprises at least one wire connector pad.

13. The electrical connector of claim 1 wherein said connector means comprises said electrically conductive portion in which the thickness of said electrically conductive portion is chosen to provide a mechanically stable and electrically conductive connection.

14. A thin film device comprising an electrically responsive layer;

at least one electrode extending beyond said electrically responsive layer and adapted to deliver electric current to said electrically responsive layer; and an electrical connector placed along a single edge of said device and configured to deliver electric current from a power supply to said electrode, said electrical connector comprising a flexible insulator having on at least one face an electrically conductive portion adapted to establish electrical contact between said electrode and a power supply, at least a portion of said insulator being adapted for insertion into a portion of said electrically responsive layer of said device, an electrically conductive adhesive provided on said electrically conductive portion of said insulator adjacent said electrode to establish electrical contact with said electrode, said electrically conductive adhesive comprising electrically conductive particles dispersed throughout an adhesive matrix in which the effective contact area between the electrically conductive particles and said electrode is sufficiently high to ensure current transfer while minimizing heat build-up in said electrode in the area beneath the electrically conductive particles, and connector means in electrical contact with the electrically conductive portion of said insulator and adapted to establish electrical contact with a power supply.

15. The device of claim 14 wherein said device is an electro-optical device.

16. The device of claim 15 wherein said electrically responsive layer comprises an electroluminescent layer.

17. The device of claim 15 wherein said electrically responsive layer comprises an electrochromic layer.

18. The device of claim 15 wherein said electrically responsive layer comprises a liquid crystal layer.

19. The device of claim 15 wherein said electrically responsive layer comprises a PDLC layer.

20. The device of claim 15 wherein said electrically responsive layer comprises an NCAP layer.

21. The device of claim 14 wherein said adhesive is flexible.

22. The device of claim 14 wherein said adhesive comprises a pressure sensitive adhesive, hot melt adhesive, thermoset adhesive, or thermoplastic adhesive.

23. The device of claim 14 wherein the thickness of said adhesive provided on each electrically conductive portion of said insulator is no greater than 50 μm.

24. The device of claim 14 wherein said insulator comprises a polyester, polyimide, polyether imide, poly(phenylene oxide), polysulfone, or polyether ether ketone film.

25. The device of claim 24 wherein said insulator is a poly(ethylene terephthalate) film.

26. The device of claim 14 wherein said electrically conductive portion of said insulator comprises at least one metal strip in contact with at least a portion of a face of said insulator.

27. The device of claim 26 wherein said metal strip is adhered to at least a portion of a face of said insulator.

28. The electrical connector of claim 26 wherein said metal strip is metallized to at least a portion of a face of said insulator.

29. The device of claim 14 wherein said electrically conductive portion comprises silver or copper.

30. The device of claim 14 wherein each face of said insulator is provided with an electrically conductive portion and each of said electrically conductive portions is provided with an electrically conductive adhesive to establish electrical contact with the electrodes of said device.

31. The device of claim 14 wherein said connector means comprises at least one wire connector pad.

32. The device of claim 14 wherein said connector means comprises said electrically conductive portion in which the thickness of said electrically conductive portion is chosen to provide a mechanically stable and electrically conductive connection.

33. The device of claim 14 wherein said electrode further comprises a buss bar to distribute current throughout said electrode.

34. The device of claim 14 further comprising a power supply.

35. The device of claim 34 wherein said power supply is a line-operated zero cross power switch.

36. The device of claim 14 wherein said electrically responsive layer and said electrode are sandwiched between two sheets of optically clear glazing material, and said electrical connector is configured such that said connector means and a portion of said insulator and its associated electrically conductive portion lie beyond the edge of at least one of said sheets such that electrical contact with a power supply is established beyond the edge of at least one of said sheets.

37. The device of claim 36 wherein said sheets are offset relative to each other, and said electrical connector is positioned within the offset area such that said connector means and a portion of said insulator and its associated electrically conductive portion lie beyond the edge of one of said sheets and electrical contact with a power supply is established beyond the edge of one of said sheets.

38. The device of claim 36 wherein said sheets are aligned with each other and said connector means and a portion of said insulator and its associated electrically conductive portion lie beyond the edges of both of said sheets and electrical contact with a power supply is established beyond the edges of both of said sheets.

39. The device of claim 36 wherein said optically clear glazing material comprises glass.

40. The device of claim 36 wherein the inner surfaces of said optically clear glazing material are provided with a layer of an optically clear thermoplastic polymer that flows at the temperatures used to laminate the components of said device together.

41. The device of claim 40 wherein said thermoplastic polymer comprises poly(vinyl butyral), a polyurethane, or an ethylene vinyl acetate copolymer.

42. A thin film electro-optical device comprising
(a) an electrically responsive PDLC layer;
(b) at least one transparent electrode adapted to deliver electric current to said electrically responsive layer;
(c) an electrical connector placed along a single edge of said electro-optical device and configured to deliver electric current from a power supply to said electrode, said electrical connector comprising
a flexible thin film insulator having on at least one face an electrically conductive portion adapted to establish electrical contact between said electrode and a power supply, at least a portion of said insulator being adapted for insertion into a portion of said electrically responsive layer of said electro-optical device,
a flexible, electrically conductive adhesive provided on said electrically conductive portion of said insulator adjacent said electrode to establish electrical contact with said electrode,
said electrically conductive adhesive comprising electrically conductive particles dispersed throughout an adhesive matrix in which the effective contact area between the electrically conductive particles and said electrode is sufficiently high to ensure current transfer while minimizing heat build-up in said electrode in the area beneath the electrically conductive particles, and
connector means in electrical contact with the electrically conductive portion of said insulator and adapted to establish electrical contact with a power supply;
(d) a pair of glass sheets sandwiching said electrically responsive layer and said electrode, said electrical connector being configured such that said connector means and a portion of said insulator and its associated electrically conductive portion lie beyond the edge of at least one of said sheets such that electrical contact with a power supply is established beyond the edge of at least one of said sheets; and
(e) a line-operated zero cross power switch for supplying electric current.

* * * * *